US012423480B2

(12) United States Patent
Suryanarayana et al.

(10) Patent No.: US 12,423,480 B2
(45) Date of Patent: Sep. 23, 2025

(54) ENCRYPTED ENCLAVE TO PROTECT FROM PLATFORM NONVOLATILE STORAGE ATTACKS

(71) Applicant: DELL PRODUCTS L.P., Round Rock, TX (US)

(72) Inventors: Shekar Babu Suryanarayana, Bangalore (IN); Piyush Dhamdhere, Indore (IN); Shrirathna Kg, Udupi District (IN)

(73) Assignee: Dell Products L.P., Round Rock, TX (US)

( * ) Notice: Subject to any disclaimer, the term of this patent is extended or adjusted under 35 U.S.C. 154(b) by 510 days.

(21) Appl. No.: 17/861,350

(22) Filed: Jul. 11, 2022

(65) Prior Publication Data

US 2024/0012947 A1 Jan. 11, 2024

(51) Int. Cl.
*G06F 21/78* (2013.01)
*G06F 18/214* (2023.01)
*G06F 21/57* (2013.01)
*G06F 21/64* (2013.01)

(52) U.S. Cl.
CPC ............ *G06F 21/78* (2013.01); *G06F 18/214* (2023.01); *G06F 21/575* (2013.01); *G06F 21/64* (2013.01)

(58) Field of Classification Search
CPC ...... G06F 21/78; G06F 18/214; G06F 21/575; G06F 21/64
See application file for complete search history.

(56) References Cited

U.S. PATENT DOCUMENTS

| | | | |
|---|---|---|---|
| 6,229,731 B1 | 5/2001 | Kasai et al. | |
| 8,190,885 B2 | 5/2012 | Obereiner et al. | |
| 8,452,929 B2* | 5/2013 | Bennett | G06F 11/1441 711/156 |
| 10,181,953 B1* | 1/2019 | Seidenberg | H04L 9/0861 |
| 11,163,452 B2* | 11/2021 | Rawal | G06F 3/067 |
| 11,714,579 B2* | 8/2023 | Lee | G06F 1/06 711/103 |
| 2020/0034665 A1* | 1/2020 | Ghanta | G06N 5/04 |

* cited by examiner

*Primary Examiner* — Sm A Rahman
(74) *Attorney, Agent, or Firm* — Larson Newman, LLP

(57) ABSTRACT

An information handling system includes a processor, a permanent data storage device, and a non-volatile data storage device. The processor receives a request to store an object to the non-volatile data storage device, stores the object to a secure portion of the permanent data storage device, and evaluates the request to determine whether or not the request is valid. When the first request is valid, the processor transfers the object from the secure portion of the permanent data storage device to the non-volatile data storage device. When the first request is not valid, the processor ignores the request and discards the object.

20 Claims, 8 Drawing Sheets

Boot Time Operation
(Prior to System Permanent Storage Initialization)

Boot Time Operation
(After Disk Initialization)

ENCRYPTED ENCLAVE TO PROTECT FROM PLATFORM NONVOLATILE STORAGE ATTACKS

FIELD OF THE DISCLOSURE

This disclosure generally relates to information handling systems, and more particularly relates to providing an encrypted enclave to protect from platform nonvolatile storage attacks.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a permanent data storage device and a non-volatile data storage device. The system may receive a request to store an object to the non-volatile data storage device, store the object to a secure portion of the permanent data storage device, and evaluate the request to determine whether or not the request is valid. When the first request is valid, the system may transfer the object from the secure portion of the permanent data storage device to the non-volatile data storage device. When the first request is not valid, the system may ignore the request and discards the object.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
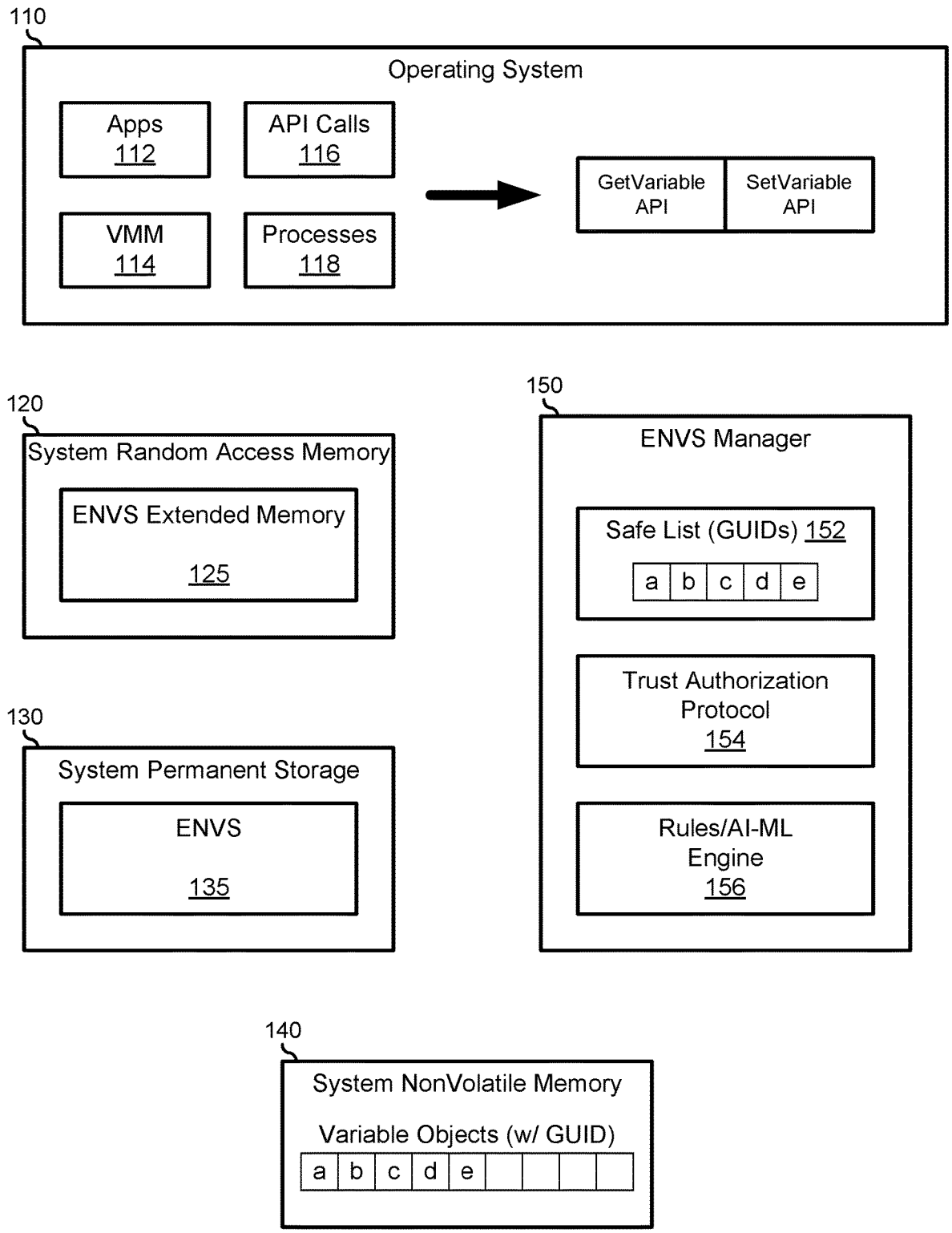
FIG. 1 is a block diagram of an information handling system according to an embodiment of the current disclosure.

FIG. 1 illustrates an information handling system 100 including an operating system environment (OS) 110, system Random Access Memory (RAM) 120, system permanent storage 130, system non-volatile (NV) memory 140, and an Encrypted Enclave NV Virtual Store (ENVS) manager 150. OS 110 represents an operating environment instantiated on the system hardware of information handling system 100, and includes applications 112, a virtual machine manager (VMM) 114, Application Programming Interfaces (APIs) 116, and processes 116. Applications 112, VMM 114, APIs 116, and processes 116 are each configured to issue SetVariable calls to write data objects to system NV memory 140 and GetVariable calls to read data objects from the system NV memory.

System RAM 120 represents memory devices of information handling system 100 that provide a main memory space for the information handling system. System RAM 120 may include discrete memory devices attached to a printed circuit board (PCB) of information handling system 100, packaged memory modules, such as Dual In-Line Memory Modules (DIMMs), that are installed into the information handling system, or other memory devices as needed or desired. System RAM 120 is typically associated with a System Physical Address (SPA) space of information handling system 100. System RAM 120 includes a block of memory allocated for an Encrypted Enclave NV Virtual Store (ENVS) extended memory region 125, as described further below.

System permanent storage 130 represents data storage devices associated with information handling system 100 that provide data storage space for larger blocks of data and for data items that are seldom utilized by information handling system 100, as needed or desired. System permanent storage 130 may include disk drive storage, solid state drive (SSD) storage, or other large-capacity memory devices associated with information handling system 100, as needed or desired. System permanent storage 130 may be installed into information handling system 100, may be remote from the information handling system, such as in a Network Attached Storage (NAS) device, a Storage Area Network (SAN) device, or the like, may represent a cloud-based storage associated with the information handling system, as needed or desired.

The proximity of system permanent storage 130 to information handling system 100 may impact the performance of information handling system 100 with respect to the functions and features associated with the current embodiments, but that such performance impacts may be deemed to be acceptable as needed or desired. System permanent storage 130 includes a portion allocated for an ENVS 135. ENVS 135 represents a storage volume of system permanent storage 130 that has restricted access rights to a Basic Input/Output System (BIOS)/Universal Extensible Firmware Interface (UEFI) of information handling system 100, or to another privileged agent instantiated on the information handling system, or a directory of such a restricted access storage volume, as needed or desired. The functions and features of ENVS 135 will be described further, below.

System NV memory 140 represents a non-volatile memory device, such as a flash memory device or other type of non-volatile memory device, that stores data permanently, that is, that retains the data stored thereon when the power to the memory device is turned off. System NV memory 140 typically represents a small capacity data storage device that may be included in the information handling system 100 that stores boot critical data and user configuration data such as an image of the system BIOS/UEFI, BIOS configuration settings, user settings for user configured programs or operating environments, or other data that is desired to be retained through a power cycle, as needed or desired. Access to system NV memory 140 is provided by a GetVariable API and a SetVariable API (henceforth "Get/Set APIs"). As illustrated here, the Get/Set APIs are part of OS 110, but this is not necessarily so, and the Get/Set APIs may be instantiated in the system BIOS/UEFI or elsewhere within information handling system 100, as needed or desired. Further, one or more of applications 112, VMM 114, APIs 116, or processes 118, or other elements of information handling system 100 may instantiate Get/Set APIs, as needed or desired.

Most boot critical data and customer config setting are stored in platform non-volatile store. If proper protection measures are not taken then platform boot will be easily compromised. UEFI/EDK2 specification poses no restriction for NV Store variable creation this leaves a big scope for NV Store exploitations and vulnerabilities. Most of the UEFI BIOS vendors depend on NV storage in SPI Flash to store the platform and customer settings. This makes it important to manage the access and modification of the NV Store only for the genuine purpose. Honoring only genuine writes by preventing vulnerable writes into platform NV store with proper training becomes very crucial for guaranteed platform boot.

It has been understood to the inventors of the current disclosure that access to system NV memory 140 is typically available to OS 110. As a first matter, the Get/Set APIs may be instantiated in OS 110, and thus may be readily available to applications 112, VMM 114, APIs 116, and processes 118. Moreover, even where the Get/Set APIs are instantiated in a system BIOS/UEFI of information handling system 100, and the system BIOS/UEFI employs access restrictions and privileged access to system NV memory, a particular application, VMM, process, or other agent instantiated on OS 110 may include its own version of Get/Set APIs. In such circumstances, having open access to system NV memory 140 leaves information handling system 100 susceptible to inadvertent or malicious access to the system NV memory that can damage the data stored on the system NV memory. In particular, known hacks to exploit the open access to system NV memory 140 may include modifying system critical data, reading of user critical data, employing denial-of-use attacks or resource hogging attacks, and the like, or other malicious accesses.

More particularly, a hacker may read existing Globally Unique Identifiers (GUIDs) variables from system NV memory 140 and rewrite the existing GUID variables to the system NV memory in an infinite loop, knowing that, when the system NV memory is full, the system NV memory firmware will initiate a reclaim operation to delete redundant copies of the existing GUID variables. This infinite loop has the effect of continuously utilizing processor resources to perform the reclaim operation, thereby reducing the overall performance of information handling system 100. Further, a hacker may write new GUID variables to system NV memory 140 until the system NV memory is full. In this case, a reclaim operation does not end up freeing any space on system NV memory, and any subsequent writes of valid GUID variables result in write failures, again resulting in the hogging of processor resources of information handling system 100. Other types of hacks utilizing both valid GUID variables and unique GUID variables may be known to hog processor resources more effectively.

ENVS manager 150 represents an application, process, utility, or the like instantiated in a secure operating environment, such as within a BIOS/UEFI of information handling system 100. ENVS manager 150 operates to intercept all GetVariable calls and SetVariable calls (henceforth collectively "Get/Set calls"), to validate the intercepted Get/Set calls prior to executing them in system NV memory 140, to execute the validated Get/Set calls, and to discard or otherwise ignore, and report the unvalidated Get/Set calls. Validated Get/Set calls may include Get/Set calls for existing objects stored in system NV memory 140, as understood to be within various call threshold limits. For example, where a particular object that has been previously validated is understood by ENVS manager 150 to have a known Get/Set call frequency, further calls to that object that are received within the known frequency may be found to be valid, while calls in excess of the known frequency may be found to be invalid.

The Get/Set call threshold limits may be determined uniquely for each object within system NV memory 140, based upon the usage of the objects that are the subject of the calls. Validated Get/Set calls may further include calls that derive from trusted sources, or that are marked as trusted by verification of signature data included with the calls. Further, Get/Set calls to previously validated objects that are within their call threshold limits, but that are received from untrusted or unknown callers may be treated as invalid until such time as the validity of the objects can be established. Further, object calls from known sources that include object that are larger or smaller than a usual size of the objects from the known sources may be treated as invalid until such time as the validity of the objects can be established. Further still, Get/Set calls that include known GUIDs but with unrecognized object names or known object names with unrecognized GUIDs, may be treated as invalid until such time as the validity of the objects can be established ENVS manager 150 includes a safe list 152, a trust authentication protocol 154, and a rules/artificial intelligence-machine learning (AI-ML) engine 156. Safe list 152 represents a list of known valid GUID variables. For example, system NV memory 140 is illustrated as including variables "a," "b," "c," "d," and "e," and safe list 152 is illustrated as including the GIUDs for variables "a," "b," "c," "d," and "e." Here, when ENVS manager 150 receives Get/Set calls, the ENVS manager stores the associated objects (for SetVariable calls) in ENVS 135, and rules/AI-ML engine 156 evaluates the Get/Set calls to determine their validity. Get/Set calls that are determined to be valid are committed to system NV memory 140, and metadata associated with the calls are stored to safe list 152.

The metadata may include the GUIDs associated with the calls, indications of valid (i.e., expected) sources of the calls, indications as to whether or not the calls included authentication signatures, and other information deemed useful in future evaluation of calls to the objects associated with the entries in safe list 152. In this way, the activities of attackers aimed toward corrupt usage of system NV memory 140 may be effectively thwarted by ENVS manager 150. The processing of SetVariable calls may be deemed to be more critical to the health of information handling system 100 and the capacity and usage of system NV memory 140, and so, as described herein, in a particular embodiment, the activities of ENVS manager 150 may be limited to validating only SetVariable calls. However, it will be understood that attacks that repeatedly issue GetVariable calls to system NV memory 140 in order to hog processing resources of information handling system 100 may likewise be thwarted by validating both GetVariable calls and SetVariable calls.

Figure 2:
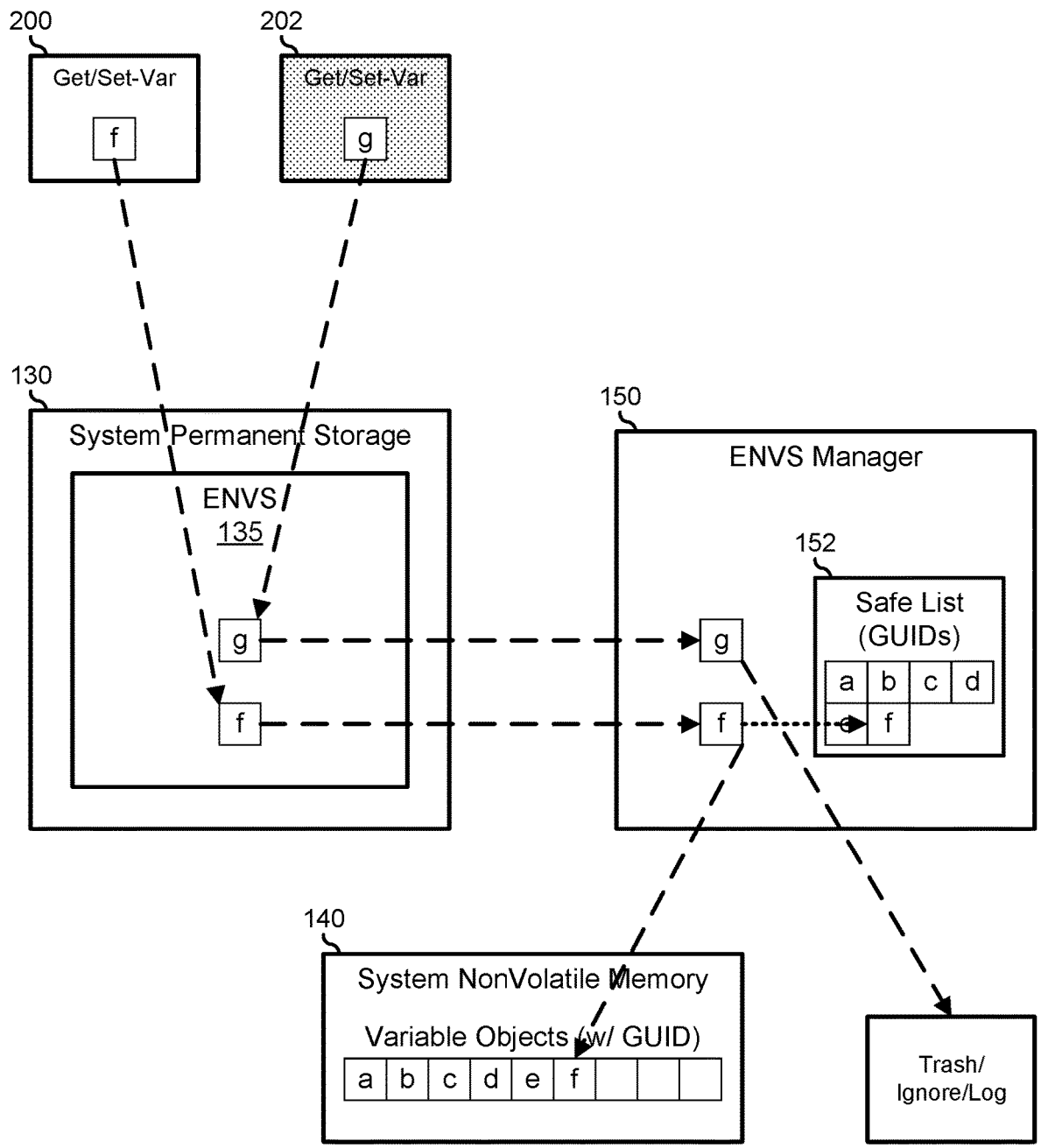
FIGS. 2-5 illustrate processing storage objects in a system non-volatile memory of the information handling system according to various embodiments of the current disclosure.

ENVS manager 150 further operates to validate Get/Set calls with unknown provenance, as shown in FIG. 2. Here, information handling system 100 receives a Get/Set call 200 and a Get/Set call 202. Both Get/Set calls 200 and 202 include objects that are not currently stored in system NV memory 140. In particular, Get/Set call 200 includes an object "f," and Get/Set call 202 includes an object "g." ENVS manager 150 stores objects "f" and "g" in ENVS 135, and rules/AI-ML engine 156 evaluates Get/Set calls 200 and 202 to determine their validity. Upon determining that Get/Set call 200 is valid, as indicated by the unshaded block, rules/AI-ML engine 156 commits object "f" to system NV memory 140 and stores the Get/Set call metadata to safe list 152. Further, upon determining that Get/Set call 202 is invalid, as indicated by the shaded block, rules/AI-ML engine 156 rejects object "g." In rejecting an object, rules/AI-ML engine 156 may commit the object to a trash file, for example for forensic analysis of the object and its associated Get/Set call, may ignore the Get/Set call, may log the invalid Get/Set call, or otherwise dispose of the invalid Get/Set call, as needed or desired.

Figure 3:
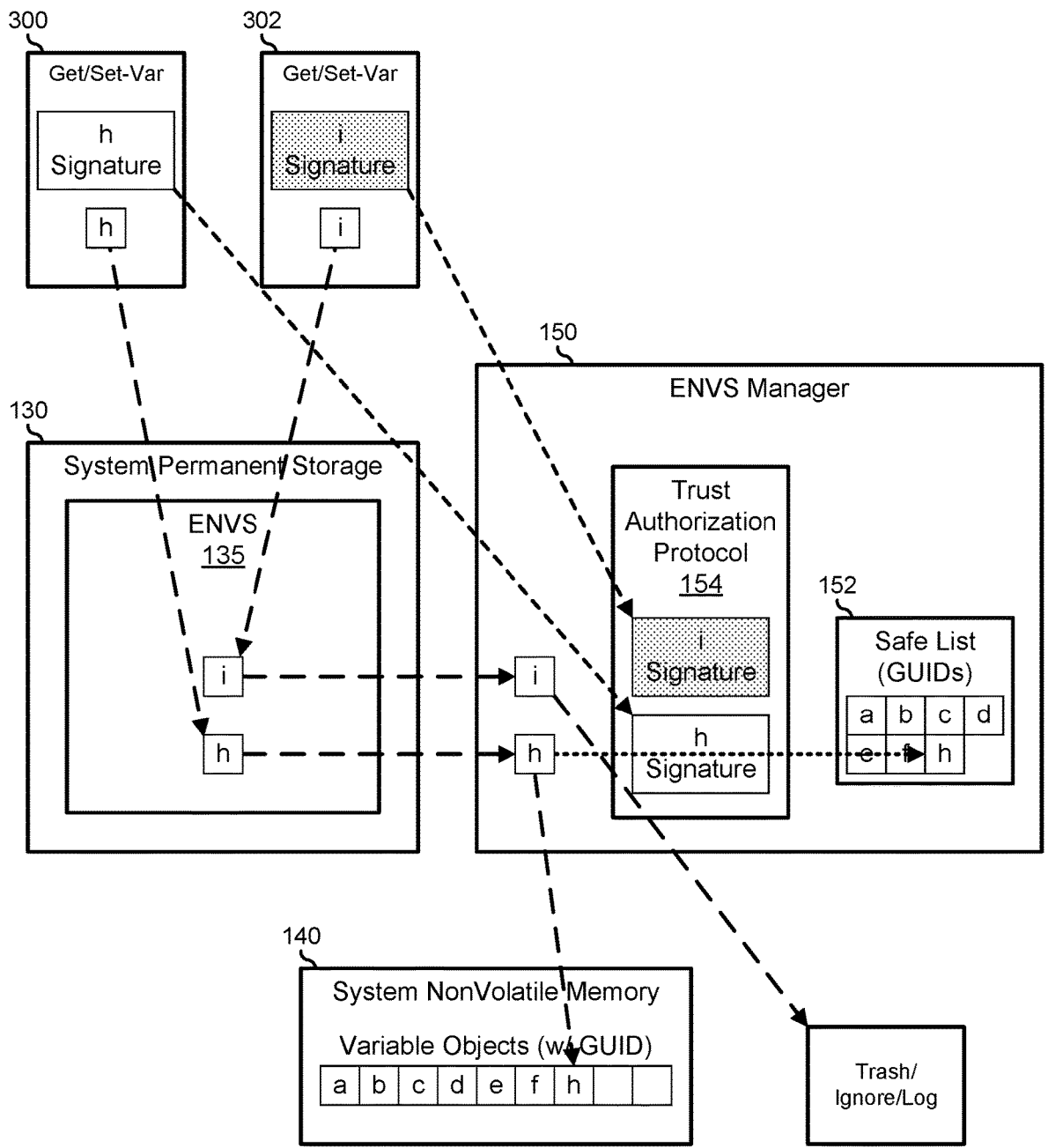

ENVS manager 150 further operates to validate signed Get/Set calls with unknown provenance, as shown in FIG. 3. Information handling system 100 receives a signed Get/Set call 300 and a signed Get/Set call 302. Both signed Get/Set calls 300 and 302 include objects that are not currently stored in system NV memory 140. In particular, signed Get/Set call 300 includes an object "h," and signed Get/Set call 302 includes an object "i." ENVS manager 150 stores objects "h" and "i" in ENVS 135, and trust authentication protocol 154 evaluates the signatures of signed Get/Set calls 300 and 302 to determine their validity. Here, in a particular embodiment, the caller of Get/Set calls 300 and 302 operates to calculate the signature of the associated objects "h" and "i."

Valid callers may have access to a signing authority, such as at a signing authority of a manufacturer of information handling system 100, a signing authority of a manufacturer of a component of the information handling system, a signing authority of another agent associated with a hardware component, firmware component, software component, or other component of the information handling system, or another signing authority as needed or desired. The details of providing signatures associated with data objects, and the verification of such signed data objects through a chain of trust via a signing authority, and other self authentication mechanisms are known in the art, and will not be further described herein, except as may be needed to illustrate the current embodiments.

Upon determining that signed Get/Set call 300 is valid, as indicated by the unshaded block, trust authorization protocol 154 or rules/AI-ML engine 156 commits object "h" to system NV memory 140 and stores the Get/Set call metadata to safe list 152. Further, upon determining that signed Get/Set call 302 is invalid, as indicated by the shaded block, trust authorization protocol 154 or rules/AI-ML engine 156 rejects object "i." In a particular embodiment, such as where a Get/Set call is received from a recognized caller, but where a signature associated with the Get/Set call may be unverified, trust authorization protocol 154 operates to store the semi-trusted object to system NV memory 140 with a timeout timer. Then, if the object remains unverified after the timeout timer expires, ENVS manager 150 operates to remove the semi-trusted object from system NV memory 140.

It has been understood by the inventors of the current disclosure that Get/Set calls may be initiated early in a boot process for an information handling system, for example, once the boot process enters a Driver Execution Environment (DXE) phase of a UEFI. On the other hand, system permanent storage 130 is typically enumerated and initialized much later in the boot process, such as late in the DXE phase of the UEFI, or later. In this regard, Get/Set calls received prior to the enumeration and initialization of system permanent storage 130 may be vulnerable to attacks on system NV memory 140 as described above. On the other hand, system RAM 120 is typically enumerated and initialized very early in the boot process, such as during a Pre-EFI Initialization Environment (PEI) phase of the UEFI.

Figure 4:
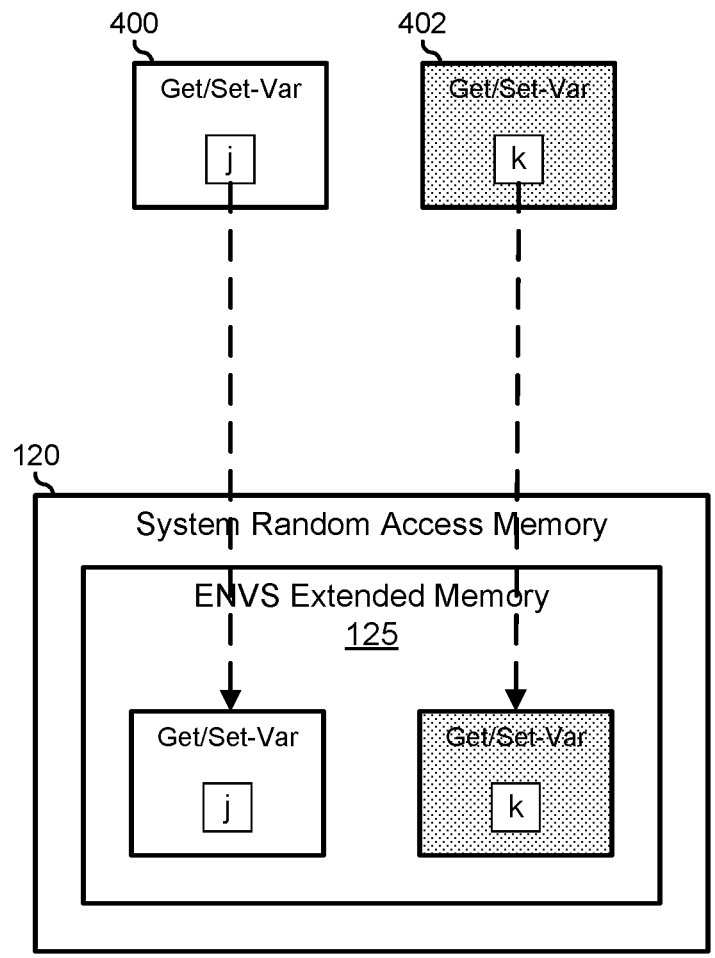

FIG. 4 illustrates the handling of Get/Set calls in information handling system 100 prior to the enumeration and initialization of system permanent storage 130. Here, at any time prior to information handling system 100 enumerating and initializing system permanent memory 130, any Get/Set calls, as typified by Get/Set call 400 and Get/Set call 402, are received and stored to ENVS extended memory 125 within system RAM 120. Here, Get/Set calls 400 and 402 are unknown, in that, their the presence or absence of their associated objects in system NV memory 140 is not determined. Get/Set call 400 includes an object "j," and Get/Set call 402 includes an object "k." Here, subsequent references to objects "j" and "k" may be serviced out of ENVS extended memory 125 until such time as the validity of the objects can be determined by ENVS manager 150, as described below.

Figure 5:
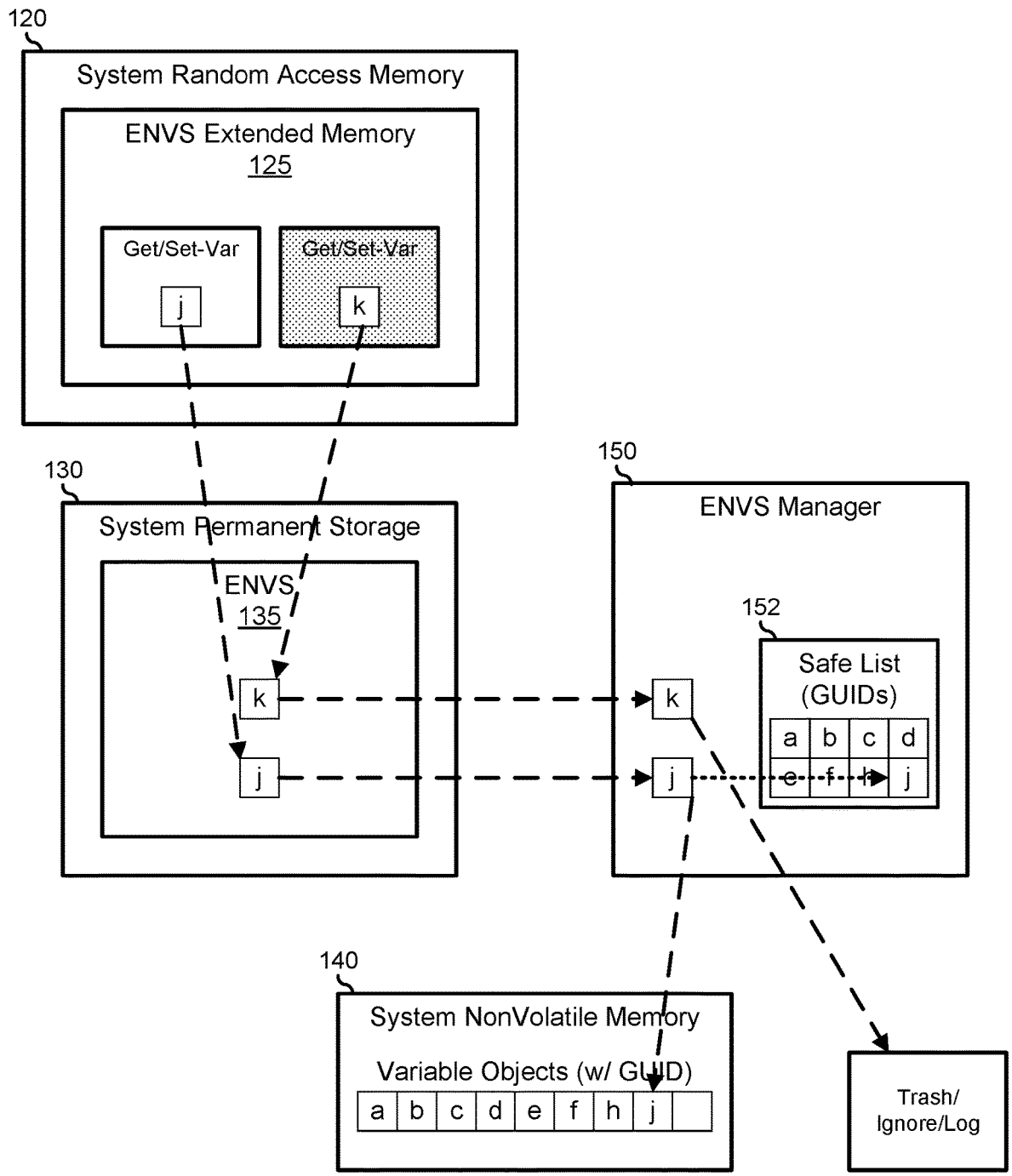

FIG. 5 illustrates the handling of Get/Set calls 400 and 402 after the enumeration and initialization of system permanent storage 130 and the set up of ENVS 135. Here, Get/Set calls 400 and 402 are treated as having been newly received by information handling system 100, and ENVS manager 150 operates to validate Get/Set calls 400 and 402 as having objects with unknown provenance. In particular, ENVS manager 150 stores objects "j" and "k" in ENVS 135, and rules/AI-ML engine 156 evaluates Get/Set calls 400 and 402 to determine their validity. Upon determining that Get/Set call 400 is valid, as indicated by the unshaded block, rules/AI-ML engine 156 commits object "j" to system NV memory 140 and stores the Get/Set call metadata to safe list 152. Further, upon determining that Get/Set call 402 is invalid, as indicated by the shaded block, rules/AI-ML engine 156 rejects object "k."

In any case, while rules/AI-ML engine 156 operates to evaluate the validity of Get/Set calls, subsequent GetVariable calls for an object being evaluated can be serviced by the copy of the object stored in ENVS 135. When ENVS manager 150 receives a GetVariable call for an object that is stored in ENVS 135, the ENVS manager operates to retrieve the object from ENVS 135 and provides the object to the caller that issued the GetVariable call. In this way, objects that are later determined to be valid can be utilized during the evaluation process. Any objects that are later determined to be invalid will be discarded as described above.

In a particular embodiment, rules/AI-ML engine 156 employs an AI-ML system to adaptively learn and improve prediction of valid objects to be stored and retrieved from system NV memory 140 and to be provided to safe list 152, and to improved detection of attacks that utilize Get/Set calls to valid objects stored in the system NV memory. For example, rules/AI-ML engine 156 may be pre-trained at a factory that manufactures information handling system 100. Here, the pre-training my include training data with valid and invalid Get/Set calls to the objects stored in system NV memory 140 to train rules/AI-ML engine 152 to distinguish between valid and invalid Get/Set calls to the factory installed objects stored in the system NV memory. Such training may be understood to train rules/AI-ML engine 156 to recognize normal Get/Set call frequencies for the various objects, including establishing different Get/Set call frequency thresholds for each object stored within system NV memory 140.

Then, during run time operation, rules/AI-ML engine 156 operates to refine the detection of valid and invalid Get/Set calls based upon the ongoing classification of the various Get/Set calls as valid or invalid. Here, rules/AI-ML engine 156 operates to establish new Get/Set call frequency thresholds for the newly classified valid objects stored in system NV memory 140. Further the Get/Set call frequency thresholds may be adaptively maintained based upon the operating conditions on information handling system 100. For example, rules/AI-ML engine 156 may learn that the Get/Set call frequency for a particular object is greater when a particular application is operating. Rules/AI-ML engine 156 may operate to increase the Get/Set call frequency threshold for that object when the application is operating, and to decrease the Get/Set call frequency threshold for that object when the application is not operating.

Figure 6:
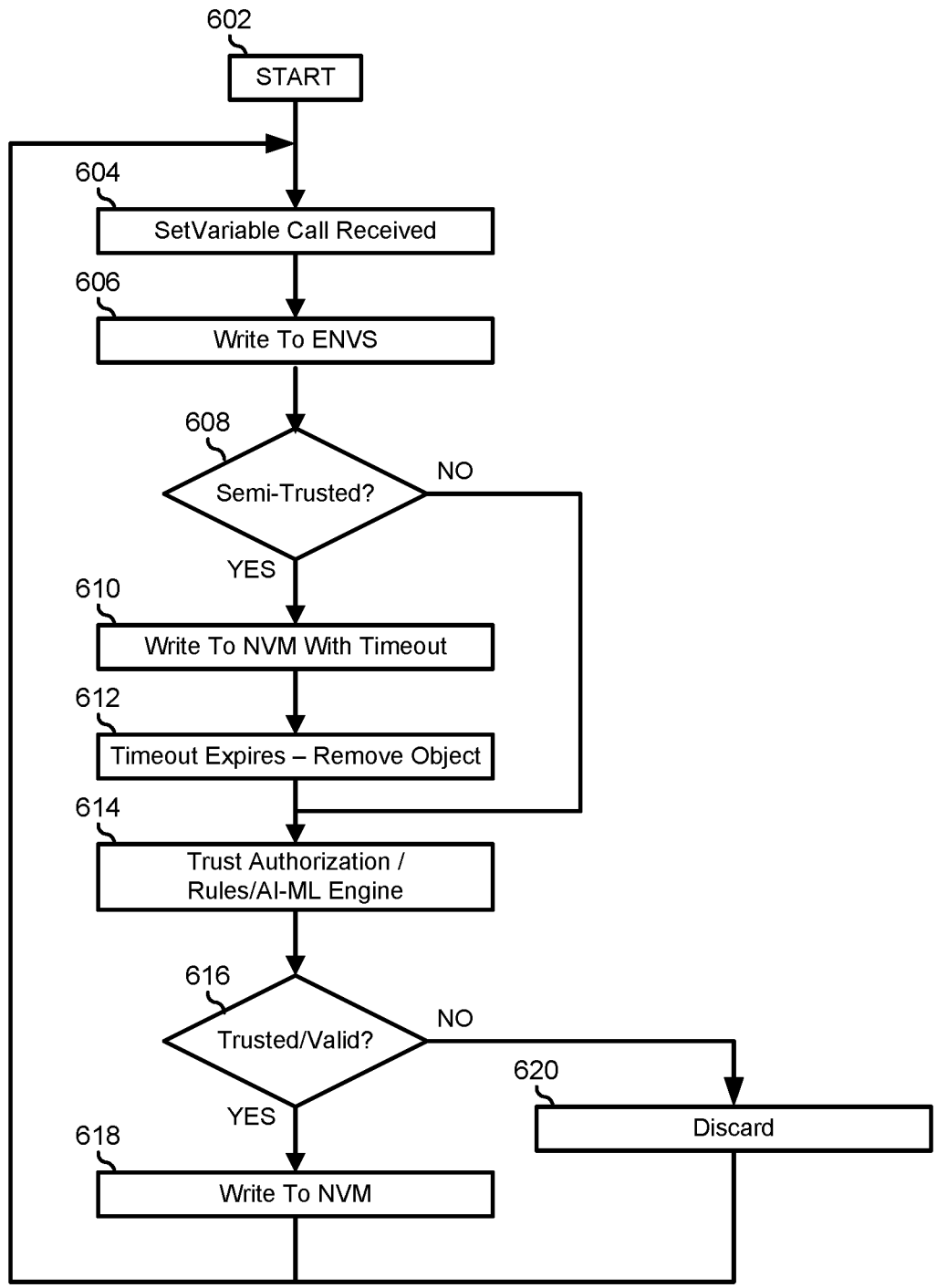
FIGS. 6 and 7 are flowcharts illustrating methods for processing storage objects in a non-volatile memory of an information handling system according to various embodiments of the current disclosure.

FIG. 6 illustrates a method 600 for processing storage objects in a system non-volatile memory of an information handling system starting at block 602. A GetVariable call is received in an information handling system in block 604, and the object associated with the GetVariable call is stored to an ENVS of a permanent memory of the information handling system in block 606. A decision is made as to whether or not the GetVariable call is semi-trusted in decision block 608. If not, the "NO" branch of decision block 608 is taken and the method proceeds to block 614 as described below. If the GetVariable call is semi-trusted, the "YES" branch of decision block 608 is taken and the object associated with the GetVariable call is written to a NV memory of the information handling system and a timeout associated with the object is set in block 610. When the timeout expires, the object is removed from the NV memory in block 612. The timeout is provided in order to verify the trust credentials associated with the GetVariable call.

The GetVariable call is authenticated, and/or validated in block 614. A decision is made as to whether or not the GetVariable call is authenticated and/or validated in decision block 616. If so, the "YES" branch of decision block 616 is taken, the object associated with the GetVariable call is written to the NM memory in block 618, and the method returns to block 604 where a next GetVariable call is received. If the GetVariable call is not authenticated and/or not validated, the "NO" branch of decision block 616 is taken, the GetVariable call is discarded in block 620, and the method returns to block 604 where a next GetVariable call is received.

Figure 7:
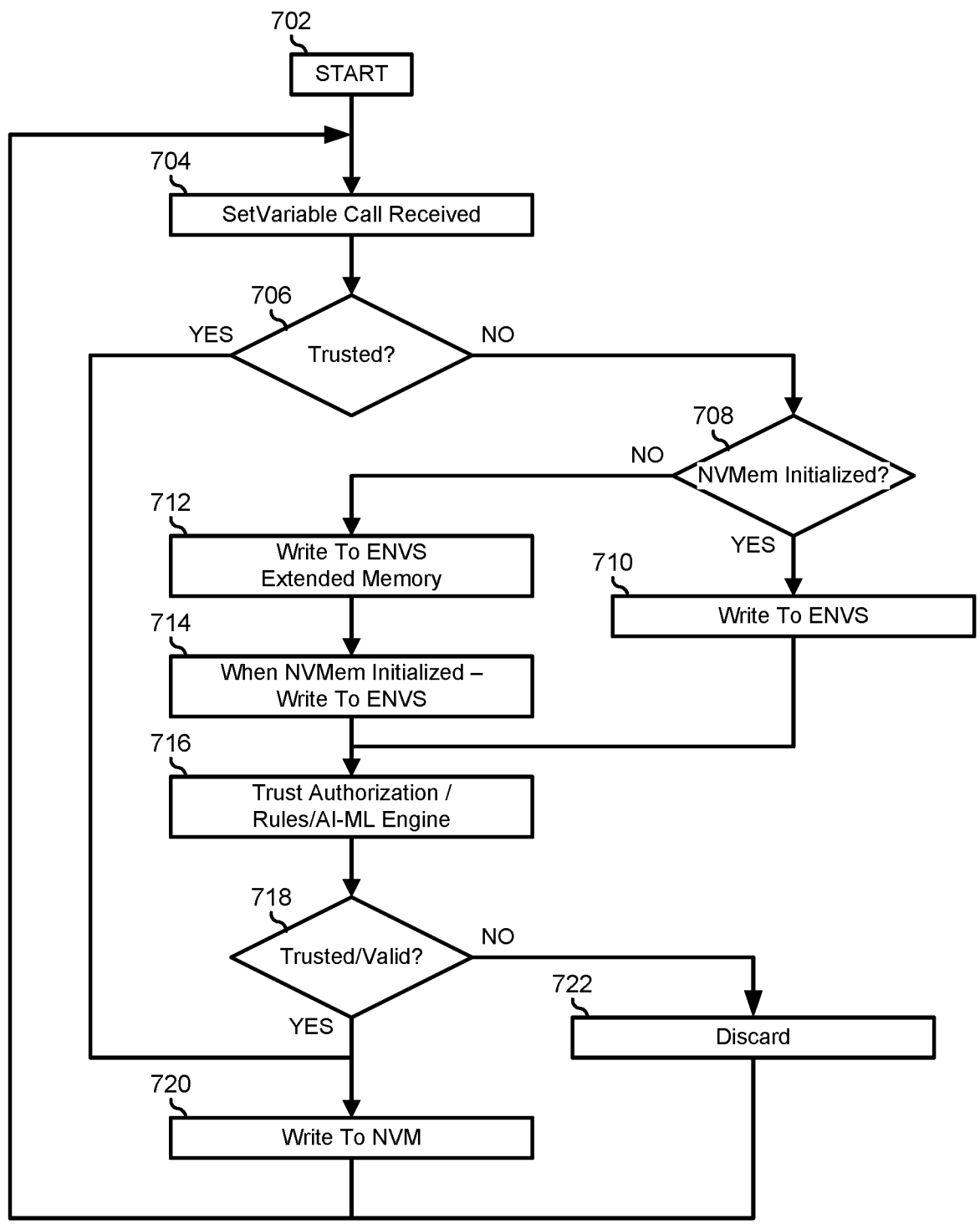

FIG. 7 illustrates a method 600 for processing storage objects in a system non-volatile memory of an information handling system starting at block 702. A GetVariable call is received in an information handling system in block 704. A decision is made as to whether or not the GetVariable call is trusted in decision block 706. If so, the "YES" branch of decision block 706 is taken, the object associated with the GetVariable call is written to a NV memory of the information handling system in block 720, and the method returns to block 704 where a new GetVariable call is received. If the GetVariable call is not trusted, the "NO" branch of decision block 706 is taken, and a decision is made as to whether or not the NV memory has been initialized in decision block 708. If so, the "YES" branch of decision block 708 is taken, the object associated with the GetVariable call is written to an ENVS of a permanent storage of the information handling system in block 710, and the method proceeds to block 716, as described below.

If the NV memory has not been initialized, the "NO" branch of decision block 708 is taken and the object associated with the GetVariable call is written to an ENVS extended memory area of a RAM of the information handling system in block 712. After the NV memory has been initialized, the object associated with the GetVariable call is written to the ENVS in block 716. The GetVariable call is authenticated, and/or validated in block 716. A decision is made as to whether or not the GetVariable call is authenticated and/or validated in decision block 718. If so, the "YES" branch of decision block 718 is taken, the object associated with the GetVariable call is written to the NM memory in block 720, and the method returns to block 704 where a next GetVariable call is received. If the GetVariable call is not authenticated and/or not validated, the "NO" branch of decision block 718 is taken, the GetVariable call is discarded in block 722, and the method returns to block 704 where a next GetVariable call is received.

Figure 8:
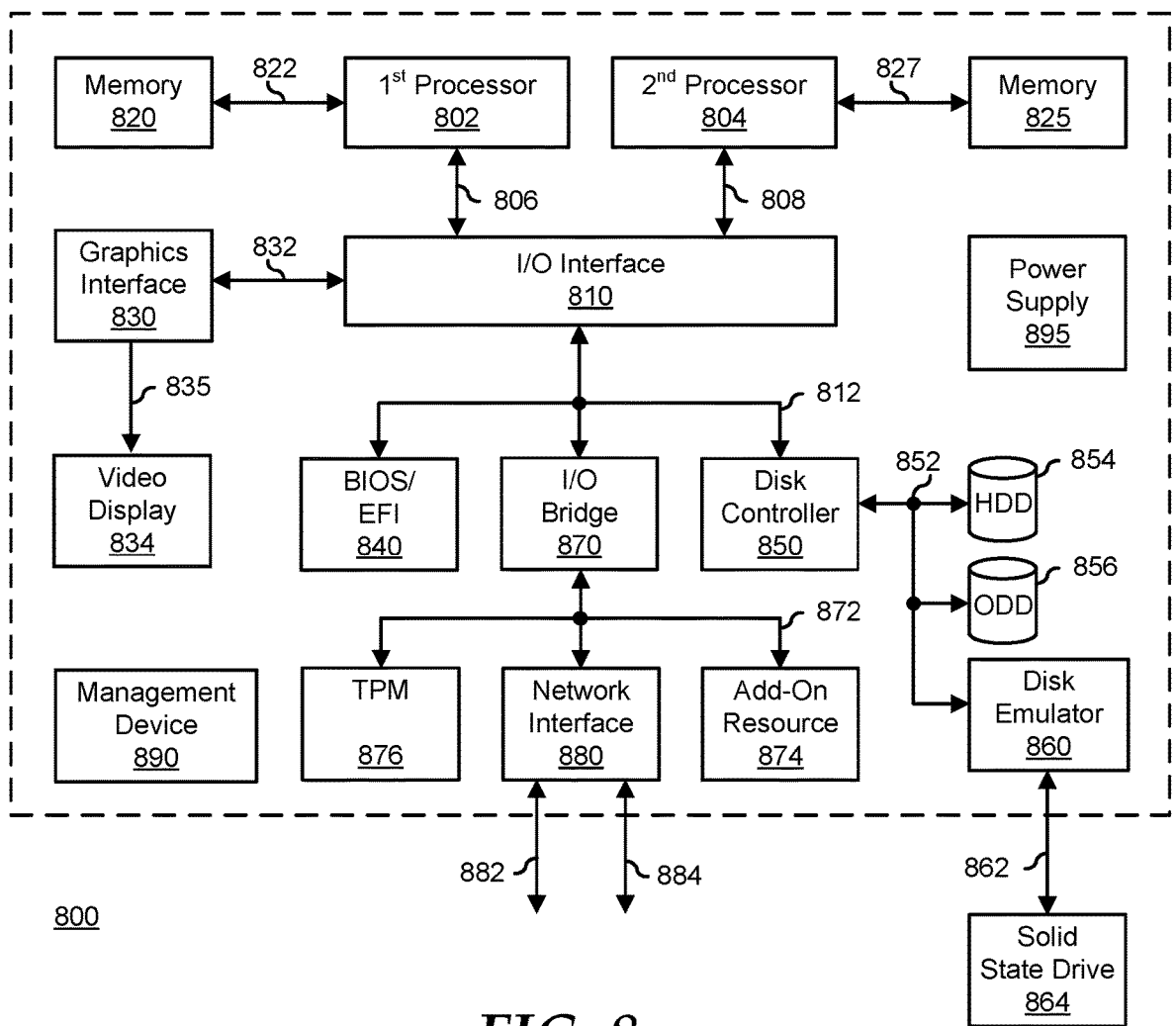
FIG. 8 is a block diagram illustrating a generalized information handling system according to another embodiment of the present disclosure.

FIG. 8 illustrates a generalized embodiment of an information handling system 800. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described below, and operates to perform one or more of the methods described below. Information handling system 800 includes a processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 862, an I/O bridge 870, one or more add-on resources 874, a trusted platform module (TPM) 876, a network interface 880, a management device 890, and a power supply 895. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 800 that operates to provide the data processing functionality of the information handling system. The host environment operates to execute machine-executable code, including platform BIOS/UEFI code, device firmware, operating system code, applications, programs, and the like, to perform the data processing tasks associated with information handling system 800.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832, and provides a video display output 836 to a video display 834. In a particular embodiment, information handling system 800 includes separate memories that are dedicated to each of processors 802 and 804 via separate memory interfaces. An example of memories 820 and 830 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 840 includes BIOS/UEFI code operable to detect resources within information handling system 800, to provide drivers for the resources, initialize the resources, and access the resources. BIOS/UEFI module 840 includes code that operates to detect resources within information handling system 800, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O bridge 870 includes a peripheral interface 872 that connects the I/O bridge to add-on resource 874, to TPM 876, and to network interface 880. Peripheral interface 872 can be the same type of interface as I/O channel 812, or can be a different type of interface. As such, I/O bridge 870 extends the capacity of I/O channel 812 when peripheral interface 872 and the I/O channel are of the same type, and the I/O bridge translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as I/O interface 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 800. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 800, such as system cooling fans and power supplies. Management device 890 can include a network connection to an external management system, and the management device can communicate with the management system to report status information for information handling system 800, to receive BIOS/UEFI or system firmware updates, or to perform other task for managing and controlling the operation of information handling system 800. Management device 890 can operate off of a separate power plane from the components of the host environment so that the management device receives power to manage information handling system 800 when the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 890 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor;
a permanent data storage device; and
a non-volatile data storage device;
wherein the processor is configured to:
receive a first request to store a first object to the non-volatile data storage device;
store the first object to a secure portion of the permanent data storage device;
evaluate the first request to determine whether the first request is valid;
transfer the first object from the secure portion of the permanent data storage device to the non-volatile data storage device in response to determining that the first request is valid based upon a call threshold limit associated with the first object; and
ignore and report the first request and discard the first object in response to determining that the first request is not valid based upon the call threshold limit.

2. The information handling system of claim 1, wherein the processor is further configured to store a first identifier of the first object in a safe list in further response to determining that the first request is valid.

3. The information handling system of claim 2, wherein the processor is further configured to:
receive a second request to store an unknown object to the non-volatile data storage device;
determine that the unknown object is the first object based upon the first identifier; and
transfer the unknown object directly to the non-volatile data storage device in response to determining that the unknown object is the first object.

4. The information handling system of claim 1, wherein the processor is further configured to:
receive a second request to store a second object to the non-volatile data storage device, wherein the second request includes a signature of the second object;
evaluate the second request to determine whether or not the signature is trusted;
transfer the second object directly to the non-volatile data storage device in response to determining that the signature is trusted; and
ignore the second request and discard the second object in response to determining that the signature is not trusted.

5. The information handling system of claim 4, wherein, in evaluating the second request, the processor is further configured to authenticate the signature with a signing authority.

6. The information handling system of claim 1, further comprising:
a random access memory;
wherein the processor is further configured to:
receive a second request to store a second object to the non-volatile data storage device at a time prior to an initialization of the permanent data storage device in a boot process for the information handling system; and
store the second object to the random access memory.

7. The information handling system of claim 6, wherein the processor is further configured to:
determine that the permanent data storage device has been initialized in the boot process; and
store the second object to the secure portion of the permanent data storage device in response to determining that the permanent data storage device has been initialized.

8. The information handling system of claim 7, wherein the processor is further configured to:
evaluate the second request to determine whether or not the second request is valid in response to storing the second object to the secure portion;
transfer the second object from the secure portion of the permanent data storage device to the non-volatile data storage device in response to determining that the second request is valid; and
ignore the second request and discard the second object in response to determining that the second request is not valid.

9. The information handling system of claim 1, wherein, in evaluating the first request, the processor is further configured to utilize a machine learning algorithm.

10. The information handling system of claim 9, wherein the machine learning algorithm is trained based upon objects stored in the non-volatile memory device when the information handling system is manufactured.

11. A method, comprising:
receiving, by an information handling system, a first request to store a first object to a non-volatile data storage device of the information handling system;
storing the first object to a secure portion of a permanent data storage device of the information handling system;
determining whether the first request is valid based upon a call threshold limit associated with the first object;
transferring the first object from the secure portion of the permanent data storage device to the non-volatile data storage device if the first request is valid; and
ignoring and reporting the first request and discard the first object if the first request is not valid.

12. The method of claim 11, further comprising storing a first identifier of the first object in a safe list in further response to determining that the first request is valid.

13. The method of claim 12, further comprising:
receiving a second request to store an unknown object to the non-volatile data storage device;
determining that the unknown object is the first object based upon the first identifier; and
transferring the unknown object directly to the non-volatile data storage device in response to determining that the unknown object is the first object.

14. The method of claim 11, further comprising:
receiving a second request to store a second object to the non-volatile data storage device, wherein the second request includes a signature of the second object;
evaluating the second request to determine whether or not the signature is trusted;
transferring the second object directly to the non-volatile data storage device in response to determining that the signature is trusted; and
ignoring the second request and discard the second object in response to determining that the signature is not trusted.

15. The method of claim 14, wherein the method further comprises authenticating the signature with a signing authority.

16. The method of claim 11, further comprising:
receiving a second request to store a second object to the non-volatile data storage device at a time prior to an initialization of the permanent data storage device in a boot process for the information handling system; and
storing the second object to a random access memory of the information handling system.

17. The method of claim 16, further comprising:
determining that the permanent data storage device has been initialized in the boot process; and
storing the second object to the secure portion of the permanent data storage device in response to determining that the permanent data storage device has been initialized.

18. The method of claim 17, further comprising:
evaluating the second request to determine whether or not the second request is valid in response to storing the second object to the secure portion;
transferring the second object from the secure portion of the permanent data storage device to the non-volatile data storage device in response to determining that the second request is valid; and
ignoring the second request and discard the second object in response to determining that the second request is not valid.

19. The method of claim 11, wherein the information handling system is further configured to utilize a machine learning algorithm that is trained based upon objects stored in the non-volatile memory device when the information handling system is manufactured.

20. An information handling system, comprising:
a processor;
a permanent data storage device; and
a non-volatile data storage device;
wherein the processor is configured to:
receive a first request to store a first object to the non-volatile data storage device;
store the first object to a secure portion of the permanent data storage device;
determine whether the first request is valid based upon a call threshold limit associated with the first object;
if the first request is valid, then transfer the first object from the secure portion of the permanent data storage device to the non-volatile data storage device, and store a first identifier of the first object in a safe list;
if the first request is not valid, the ignore the first request and discard the first object;
receive a second request to store an unknown object to the non-volatile data storage device;
determine that the unknown object is the first object based upon the first identifier;
transfer the unknown object directly to the non-volatile data storage device in response to determining that the unknown object is the first object;
receive a second request to store a second object to the non-volatile data storage device, wherein the second request includes a signature of the second object;
evaluate the second request to determine whether or not the signature is trusted;
transfer the second object directly to the non-volatile data storage device in response to determining that the signature is trusted; and
ignore and report the second request and discard the second object in response to determining that the signature is not trusted.

* * * * *